Figure 1:
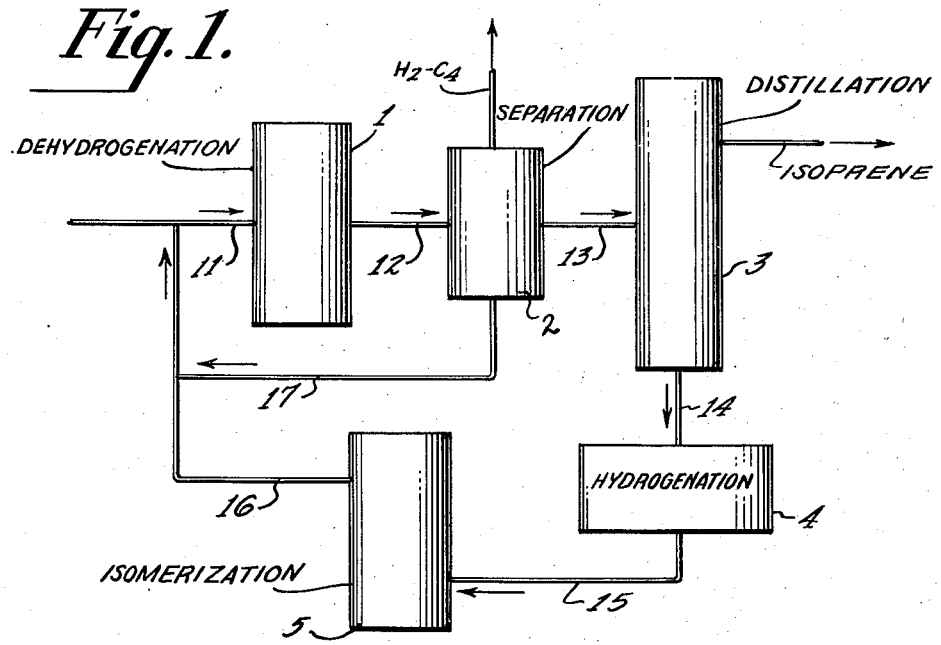

INVENTORS.
*Heinz Heinemann,
Thomas H. Milliken, Jr. &
Donald H. Stevenson*

BY
*ATTORNEY.*

2,900,429
PREPARATION OF ISOPRENE

Heinz Heinemann, Swarthmore, Thomas Henry Milliken, Jr., Moylan, and Donald Herbert Stevenson, Milmont Park, Pa., assignors to Houdry Process Corporation, Wilmington, Del., a corporation of Delaware Application April 5, 1957, Serial No. 651,011

12 Claims. (Cl. 260—680)

This invention relates to the preparation of isoprene from $C_5$ hydrocarbons and is particularly concerned with preparational methods whereby high yields of isoprene are obtained by selective processing especially adapted to the conversion of $C_5$ charge stocks containing $C_5$'s other than isopentane present in small to substantially large amounts.

The commercial preparation of isoprene (2,methyl 1,3 butadiene) has not been widely practiced in that the more practical methods of conversion have required a charge stock of predominantly isopentane which in itself is a valuable material having high price and a high degree of marketability. Other difficulties have included the practical separation of isoprene from other $C_5$ isomers; also, the production of relatively large amounts of other forms of $C_5$ compounds which have relatively low market demand and an exorbitantly high cost of separation into specific useable materials. Attempts have been made to employ charge stocks containing up to substantial amounts of normal pentane, but the available processes necessary to convert such charge stocks to significant amounts of mono and diolefins led to excessive degradation of the charge stock with resultant loss of desired product and possibly reuseable effluent.

The present application advantageously presents means for processing mixed $C_5$ charge stocks to high yields of isoprene with relatively little attendant loss to hydrocarbon compounds other than $C_5$'s. This method likewise is highly advantageous in that provision is made for the practical treatment of the product from which isoprene has been selectively removed to convert residual diolefins, heretofore comprising a relatively serious problem, to materials suitable for processing into isoprene.

In accordance with this invention, isoprene is prepared from acyclic $C_5$ hydrocarbons by process comprising, subjecting a charge of $C_5$ hydrocarbons to dehydrogenation at dehydrogenation conditions; selectively separating the effluent from dehydrogenation to recover therefrom substantially all of the $C_5$ diolefins; effecting separation of the diolefins and recovering therefrom substantially pure isoprene and a second stream comprising substantially residual $C_5$ diolefins; selectively hydrogenating said residual $C_5$ diolefins to monoolefins; isomerizing normal monoolefins and returning the isomerizate with other $C_5$ components in the system excepting isoprene to the dehydrogenation stage.

The dehydrogenation stage contemplates the usage of the wide variety of known dehydrogenation catalysts of which the commercially available chromia on alumina (about 20 weight percent $Cr_2O_3$) is a typical and suitable embodiment. Operating conditions include temperatures in the range of about 1000° to 1100° F., pressure in the range of 1 to 7 inches of mercury, and a space rate based on volume of the charge as liquid of 0.7 to 2 volumes of charge per volume of catalyst per hour.

The selective hydrogenation of the residual $C_5$ diolefin fraction is concerned predominantly with the selective hydrogenation of piperylene. The hydrogenation conditions are generally within the range of 375–475° F. with a preferred temperature in the range of 410–440° F. Pressures of 20–100 p.s.i.g. (pounds per square inch gauge) are employed with a preferred range being 40–60 p.s.i.g. A hydrogen-piperylene molar ratio of 1–5, preferably of about 2–4 is employed; the hydrogen may be obtained from an extraneous source or may be the hydrogen from the effluent from the dehydrogenation zone. Suitable catalysts for the selective hydrogenation may be nickel sulfide on alumina in which the nickel may be from 5–20% and preferably about 10%; or nickel tungsten sulfide, either supported or non-supported; or supported (e.g., alumina) tungsten sulfide. Another catalyst possible is molybdena sulfide supported on alumina, in which the temperature of hydrogenation is preferably about 25° F. above that employed with the previously mentioned hydrogenation catalysts. Selective hydrogenation of the diolefins to monoolefins may also be effected over reduced nickel or copper catalyst, for example, one comprising about 6% copper or nickel on an inert support such as porous silica, operation approximately in the range of about 400–500° F. (see Perkins U.S. Patent No. 1,982,536).

The selective hydrogenation effectively produces substantially complete conversion of piperylene to the $C_5$ monoolefins, pentene-1 and/or pentene-2. To selectively utilize the monoolefins for isoprene production, the iso form is highly preferable. The monoolefins from the selective hydrogenation are therefore subjected to an isomerization treatment in which the normal pentenes are selectively isomerized to isopentenes. In general, paraffinic $C_5$'s present with the olefins are unaffected during the treatment.

The selective isomerization step may be effected as shown in the following description. One suitable catalyst is activated alumina, which is employed at atmospheric pressure, with a space rate of about 2 volume of charge per volume of catalyst per hour at about 800° F.; such conditions are conducive to the conversion of pentene-2 to about 60% with selectivity in the production of methyl butene in the order of about 75%. Utilizing HF-activated alumina at atmospheric pressure and 600° F. with a liquid hourly space rate in the range of about 2 v./v./hr., pentene-1 is converted to the extent of approximately 95% with the selectivity for methyl butene of about 45%, and for pentene-2 of somewhat less than 40%. At a higher space rate using the HF activated alumina, a higher degree of selectivity for pentene-2, in the order of 50%, is obtained at about 4 v./v./hr. Another catalyst is silica alumina of the type generally classified as cracking catalyst which when employed at atmospheric pressure and a temperature in the range of 400–415° F. at 2 v./v./hr. shows 100% conversion of pentene-1 with selectivity for methyl butene of about 40% and for pentene-2 of about 55%. At temperatures in the order of 800° F., the same catalyst shows somewhat higher selectivity and yields in the conversion of pentene-2.

From the foregoing, it is apparent that the higher temperatures are more adapted to the conversion of pentene-2 to methyl butenes. It is therefore within the skill of the operator to adjust operating conditions for the optimum isomerization effect on the basis of the composition of the monoolefin content of the charge to the isomerization step.

Figure 2:
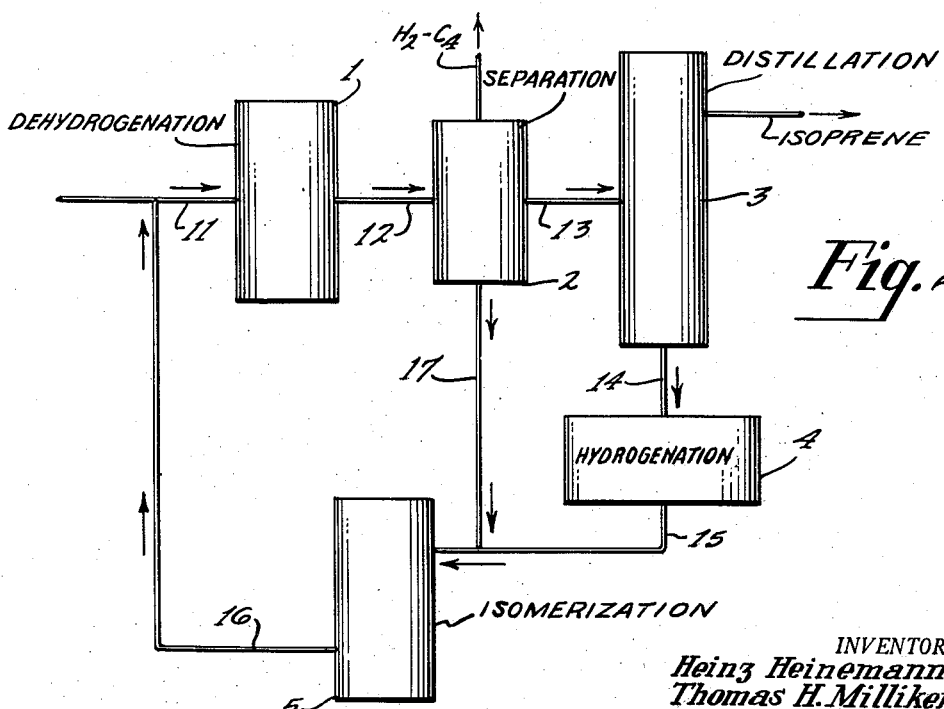

Fuller understanding of the invention may be had by reference to the attached drawing in which Figure 1 shows a diagrammatic flow pattern in which substantially only the product from the hydrogenator is passed through the isomerization step; and in which Figure 2 shows a diagrammatic flow pattern in which the bulk of the paraffins and the monoolefin fraction from the initial separation stage is added to the hydrogenated $C_5$'s for passage through the isomerization zone.

Referring now particularly to Figure 1, the flow pattern shows a stream of mixed pentanes and pentenes introduced through line 11 to dehydrogenation reactor 1. The effluent from the dehydrogenation passes through line 12 into separation zone 2 in which $C_4$'s and lighter hydrocarbons to and including hydrogen are removed as one stream and a second stream comprising substantially only diolefins passes through line 13 into distillation system 3. In system 3, substantially all of the isoprene is separated and passed to product. Residual $C_5$ diolefins, mainly piperylene are passed through line 14 into hydrogenation reactor 4 for practically complete selective hydrogenation of the piperylene to monoolefins. Product from hydrogenation is admitted through line 15 into the isomerization zone 5 wherein normal monoolefins are selectively converted to isopentenes in respectable yield. The product from isomerization zone 5 passes through line 16 where it is commingled with a third stream, from line 17 from separator 2, continuing saturated $C_5$'s and monoolefin $C_5$'s. The mixture is returned to line 11 for recycle through the system.

Another embodiment appears in Figure 2 wherein the process differs from that shown in Figure 1 in that the recycle product stream in line 16 comprises the entire effluent from the isomerization zone 5 which in turn processes the streams from hydrogenation reactor 4 introduced through line 15 and the saturated and monoolefin stream carried through line 17 as the third stream from separation zone 2.

A better understanding of the processing of $C_5$ streams to high yields of isoprene will be had from consideration of the following examples.

*Example I*

The charge stock has the approximate composition by weight of: 26.4% pentanes as fresh feed and comprising about 13.2 normal and 13.2 isopentanes, and 73.6% recycle $C_5$'s comprising about 19% normal and 19% isopentanes and 17.7% n- and 17.9% isopentenes. The charge is introduced to the dehydrogenation zone containing a standard-type chromia-alumina dehydrogenation catalyst, and at dehydrogenation conditions including a temperature of about 1050° F., a pressure of approximately 5 inches of mercury (5″ Hg) and a space rate of one volume of charge (liquid) per volume of catalyst per hour (1 v./v./hr.). The dehydrogenation reaction may be effected in a number of ways to permit substantially continuous operation of the system wherein periodic reactivation of the catalyst is required because of the deposition on the catalyst of hydrocarbonaceous deposits and loss of temperature as a result of the endothermic nature of the dehydrogenation reaction. In the present instance the reaction is effected as a cyclic process utilizing a sufficient number of reaction zones to permit a 9 minute on-stream period for the dehydrogenation and a reactivation and temperature adjustment period of about 9 minutes.

The effluent from the dehydrogenation reaction is passed to the separation zone where, by suitable and selective operation, three streams are separated. The first stream comprises the hydrogen and the normally gaseous hydrocarbons up to and including the $C_4$'s, and amounts to about 8.2% by weight. The second stream contains substantially all of the pentadienes and amounts to about 30.3% by weight. The third stream is the recycle stream containing about 38 weight percent pentanes and 21.5 weight percent pentenes. The first stream containing the hydrogen and lighter hydrocarbons is discharged from the system as for fuel or other refinery purposes; the pentadiene stream is introduced to the distillation zone for separation into product isoprene and a residual portion.

Fractionation of the pentadiene stream yields about 15.6 weight percent of isoprene product which is passed to storage.

The residual portion of about 14.7% is mainly piperylene. This residual portion is sent to the selective hydrogenation zone and contacted with a catalyst comprising about 10 weight percent nickel sulfide supported on alumina. Conditions of the selective hydrogenation include a temperature of about 420° F., a pressure of about 50 pounds per square inch gauge (p.s.i.g.), a hydrogen to piperylene ratio of about 3:1, and a space rate of 3 v./v./hr. (liq.). The product is substantially pentene-1 and pentene-2. This product is subjected to isomerization.

In the isomerization treatment, the charge is contacted with silica-alumina catalyst of the type commercially used in the cracking of hydrocarbons. The conditions of contact include atmospheric pressure, a temperature of about 800° F., and a space rate of about 2 v./v./hr. (liq.). The product from the isomerization treatment contains about 14.5 weight percent of which about 7.5 weight percent is isopentene and about 7.0 weight percent is normal pentene. Approximately 1.5 weight percent of the product comprises hydrocarbons other than $C_5$'s, and is separated and removed from the system. The isomerizate is admixed with the third stream from the separation zone and the admixture is the recycle portion of the charge to dehydrogenation.

There is thus obtained a yield of about 59 weight percent of isoprene based on the amount of fresh feed charged to the system.

*Example II*

The process of Example I is followed except that the flow pattern of Figure 2 in the drawing is used. In this example, the charge comprises 27.3 weight percent fresh feed, and the balance as recycle made up of 37% pentane and 35.7% pentenes. There is recovered 15.1 weight percent isoprene in an amount equivalent to 55.2 weight percent of the fresh feed portion of the charge.

The foregoing examples are indicative only of the scope of the invention. In actual practice the charge may vary in the amount of $C_5$ components with suitable adjustment of the several separation and processing procedures to obtain the highest practical yield of isoprene consistent with efficient operation of the overall process.

Obviously many modifications and variations of the present invention as hereinbefore set forth may be made without departing from the spirit and scope thereof and therefore only such limitations should be imposed as are indicated in the appended claims.

We claim:

1. A method for the selective preparation of isoprene from acyclic $C_5$ hydrocarbons, which comprises dehydrogenating a charge of such $C_5$ hydrocarbons producing an effluent containing diolefins and monoolefins, separating said effluent into at least three separate streams comprising respectively substantially all hydrocarbons below $C_5$ plus hydrogen as a first stream, substantially only $C_5$ diolefins as a second stream, and a third stream containing $C_5$ monoolefins, separating said $C_5$ diolefin stream into an overhead fraction of product isoprene and a bottoms fraction of residual $C_5$ diolefins, selectively hydrogenating said residual $C_5$ diolefin fraction to predominantly normal $C_5$ monoolefins, isomerizing at least part of the normal olefins in said selectively hydrogenated fraction to isoolefins, and recycling said isoolefins as part of said charge of $C_5$ hydrocarbons to said dehydrogenation together with at least a portion of said third stream for further production of isoprene.

2. A method in accordance with claim 1 wherein the charge to said isomerization includes in addition to said selectively hydrogenated fraction at least a portion of said third stream.

3. A method according to claim 1 wherein said third stream is recycled to dehydrogenation without intervening isomerization.

4. A method in accordance with claim 1 wherein said dehydrogenation is effected in the presence of dehydrogenation catalyst, 5. A method in accordance with claim 4 wherein said catalyst is chromia on alumina and the dehydrogenation conditions include a temperature in the range of about 1000° to 1100° F., a pressure in the range of 1 to 7 inches of mercury, and a space rate based on volume of the charge as liquid of 0.7 to 2 volumes of charge per volume of catalyst per hour.

6. A method in accordance with claim 5 wherein said catalyst comprises about 20 weight percent $Cr_2O_3$.

7. A method in accordance with claim 1 wherein said selective hydrogenation is effected in the presence of a hydrogenation catalyst comprising an active component selected from the group consisting of nickel, copper and sulfides of nickel, tungsten and molybdenum.

8. A method in accordance with claim 7 wherein said catalytic hydrogenation is effected at conditions including a hydrogen to charge mol ratio in the range of 1–5 to 1, a temperature in the range of 375° to 475° F. and a pressure in the range of 20 to 100 p.s.i.g.

9. A method in accordance with claim 8 wherein at least a portion of said hydrogen is hydrogen from said first stream.

10. A method in accordance with claim 1 wherein said isomerization is effected in the presence of an isomerization catalyst at conditions including a temperature in the range of about 400° to 800° F., a liquid hourly space rate of up to 4 v./v./hr., and a pressure of about atmospheric.

11. A method for the selective preparation of isoprene from acyclic $C_5$ hydrocarbons, which comprises subjecting a charge of predominantly $C_5$ hydrocarbons to dehydrogenation in the presence of a catalyst comprising about 20 wt. percent $Cr_2O_3$ and about 80% $Al_2O_3$ at dehydrogenating conditions including a temperature in the range of about 1000–1100° F., a pressure in the range of 1–7 inches of mercury and a space rate based on the volume of charge as liquid of about 0.7 to 2 volumes of charge per volume of catalyst per hour, recovering the dehydrogenation product containing diolefins and monoolefins, separating said product into separate streams comprising respectively substantially all of the $C_4$ and lighter hydrocarbons plus hydrogen as a first stream, substantially only $C_5$ diolefins as a second stream and other $C_5$ hydrocarbons as a third stream, separating said $C_5$ diolefin stream into an overhead fraction of product isoprene and a bottoms fraction of residual $C_5$ diolefins, passing said residual $C_5$ diolefins to selective catalytic hydrogenation in the presence of a hydrogenation catalyst and added hydrogen at conditions including a hydrogen to charge mol ratio in the range of 1–5 to 1, a temperature in the range of about 375–475° F. and a pressure in the range of about 20–100 p.s.i.g., recovering from said selective hydrogenation a stock predominantly normal $C_5$ monoolefins, subjecting said normal $C_5$ monoolefins to catalytic isomerization in the presence of an isomerization catalyst at conditions including a temperature in the range of about 400° to 800° F., a pressure of about atmospheric and a space rate based on the liquid volume of said normal monoolefins in the range of about 2 v./v./hr., recovering from said isomerization product containing substantial quantities of iso $C_5$ monoolefins, and recycling product from said isomerization and aforesaid third stream $C_5$ hydrocarbons as a portion of said charge to said dehydrogenation for further production of isoprene.

12. A method in accordance with claim 11 wherein the material charged to said isomerization includes said other $C_5$ hydrocarbons third stream.

References Cited in the file of this patent

UNITED STATES PATENTS

| | | |
|---|---|---|
| 2,338,472 | Van Peski | Jan. 4, 1944 |
| 2,391,188 | Patterson | Dec. 18, 1945 |
| 2,421,506 | Jones | June 3, 1947 |

OTHER REFERENCES

Mavity et al.: National Petroleum News, vol. 37, No. 14, April 4, 1954, pp. R–263, R–266, R–268, R–270 and R–272.